United States Patent
Sunavala et al.

(10) Patent No.: US 10,187,263 B2
(45) Date of Patent: Jan. 22, 2019

(54) INTEGRATING PHYSICAL AND VIRTUAL NETWORK FUNCTIONS IN A SERVICE-CHAINED NETWORK ENVIRONMENT

(71) Applicant: Futurewei Technologies, Inc., Plano, TX (US)

(72) Inventors: Farhad P Sunavala, San Jose, CA (US); Hong Zhang, Palo Alto, CA (US); Henry L Fourie, Livermore, CA (US)

(73) Assignee: Futurewei Technologies, Inc., Plano, TX (US)

( * ) Notice: Subject to any disclaimer, the term of this patent is extended or adjusted under 35 U.S.C. 154(b) by 106 days.

(21) Appl. No.: 15/350,966

(22) Filed: Nov. 14, 2016

(65) Prior Publication Data

US 2018/0139098 A1    May 17, 2018

(51) Int. Cl.
*H04L 12/24* (2006.01)

(52) U.S. Cl.
CPC .......... *H04L 41/12* (2013.01); *H04L 41/0816* (2013.01)

(58) Field of Classification Search
None
See application file for complete search history.

(56) References Cited

U.S. PATENT DOCUMENTS

| | | | |
|---|---|---|---|
| 9,923,815 B2* | 3/2018 | Assarpour | H04L 45/74 |
| 2015/0009992 A1 | 1/2015 | Zhang | |
| 2015/0195197 A1* | 7/2015 | Yong | H04L 45/74 |
| | | | 370/392 |
| 2015/0215172 A1 | 7/2015 | Kumar et al. | |
| 2016/0043952 A1 | 2/2016 | Zhang et al. | |
| 2016/0134531 A1 | 5/2016 | Assarpour et al. | |
| 2016/0248858 A1 | 8/2016 | Qiu et al. | |

(Continued)

FOREIGN PATENT DOCUMENTS

| | | |
|---|---|---|
| CN | 101374096 A | 2/2009 |
| CN | 103118144 A | 5/2013 |
| CN | 105242956 A | 1/2016 |

OTHER PUBLICATIONS

Martini, Barbara, et al., "A Service-Oriented Approach for Dynamic Chaining of Virtual Network Functions over Multi-Provider Software-Defined Networks," Future Internet, MDPI, Jun. 1, 2016, 21 pages.

(Continued)

*Primary Examiner* — Otis L Thompson, Jr.
(74) *Attorney, Agent, or Firm* — Vierra Magen Marcus LLP

(57) ABSTRACT

Packets of data can be processed by a chain or sequence of service functions which include both virtual and physical service functions. In one approach, the original header and/or payload of a packet is analyzed at a software switch to determine whether the packet should be processed by the chain. If such processing is indicated, a next service function to process the packet is identified. The packet is then forwarded to a virtualized or physical device which implements the next service function. A portion of the header, such as a MAC destination address, may be modified to direct the packet to the next function. Further, in some cases, a service function chain (SFC) header with a chain identifier may be added to, or removed from, the packet.

17 Claims, 12 Drawing Sheets

(56) References Cited

U.S. PATENT DOCUMENTS

2016/0321094 A1    11/2016  Rabi et al.
2016/0344803 A1*  11/2016  Batz .................... H04L 12/1407
2016/0352629 A1*  12/2016  Wang ...................... H04L 45/38
2017/0244631 A1*   8/2017  Guichard ................ H04L 45/50
2017/0302623 A1*  10/2017  Bifulco ............... H04L 47/2441
2017/0317926 A1*  11/2017  Penno .................... H04L 45/36
2018/0062962 A1*   3/2018  Pignataro ............ H04L 43/0829

OTHER PUBLICATIONS

PCT/CN2017/108156, ISR, dated Jan. 24, 2018.

\* cited by examiner

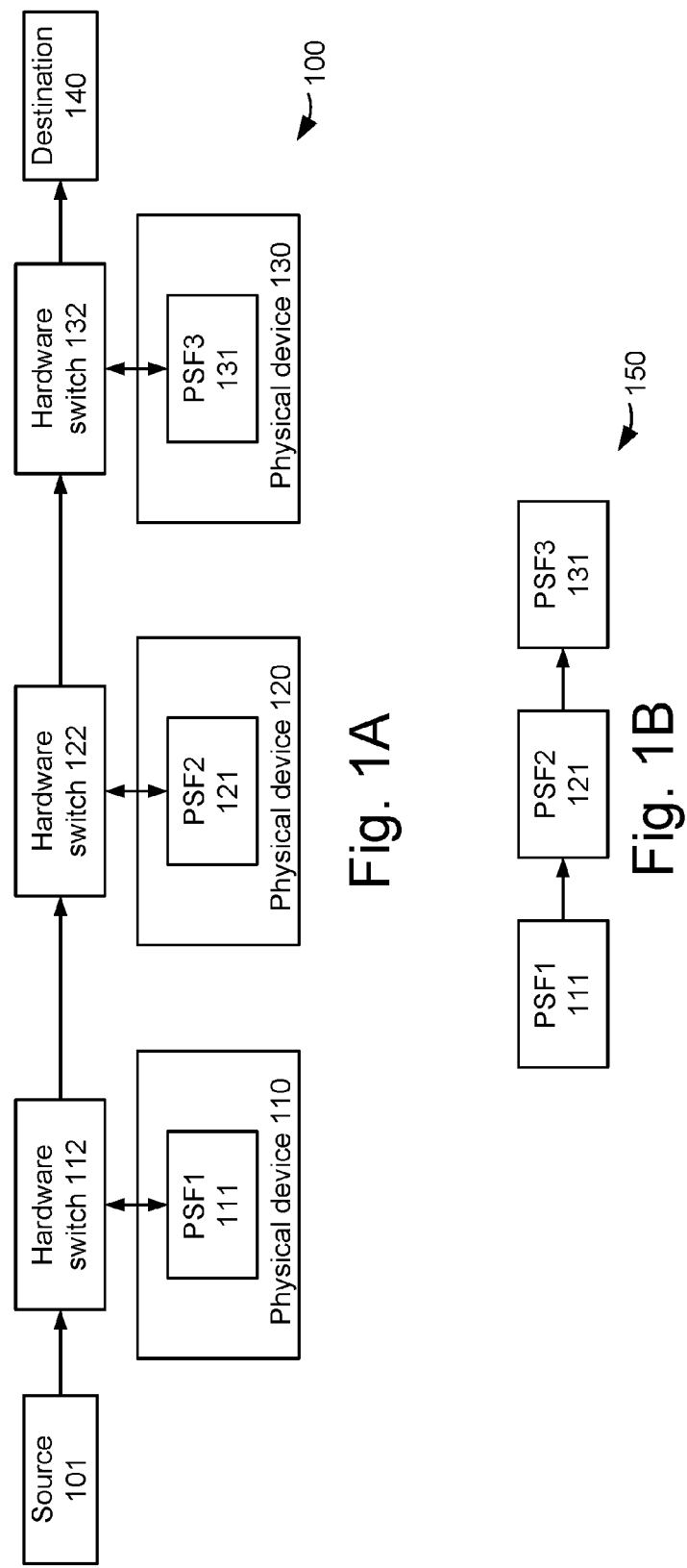

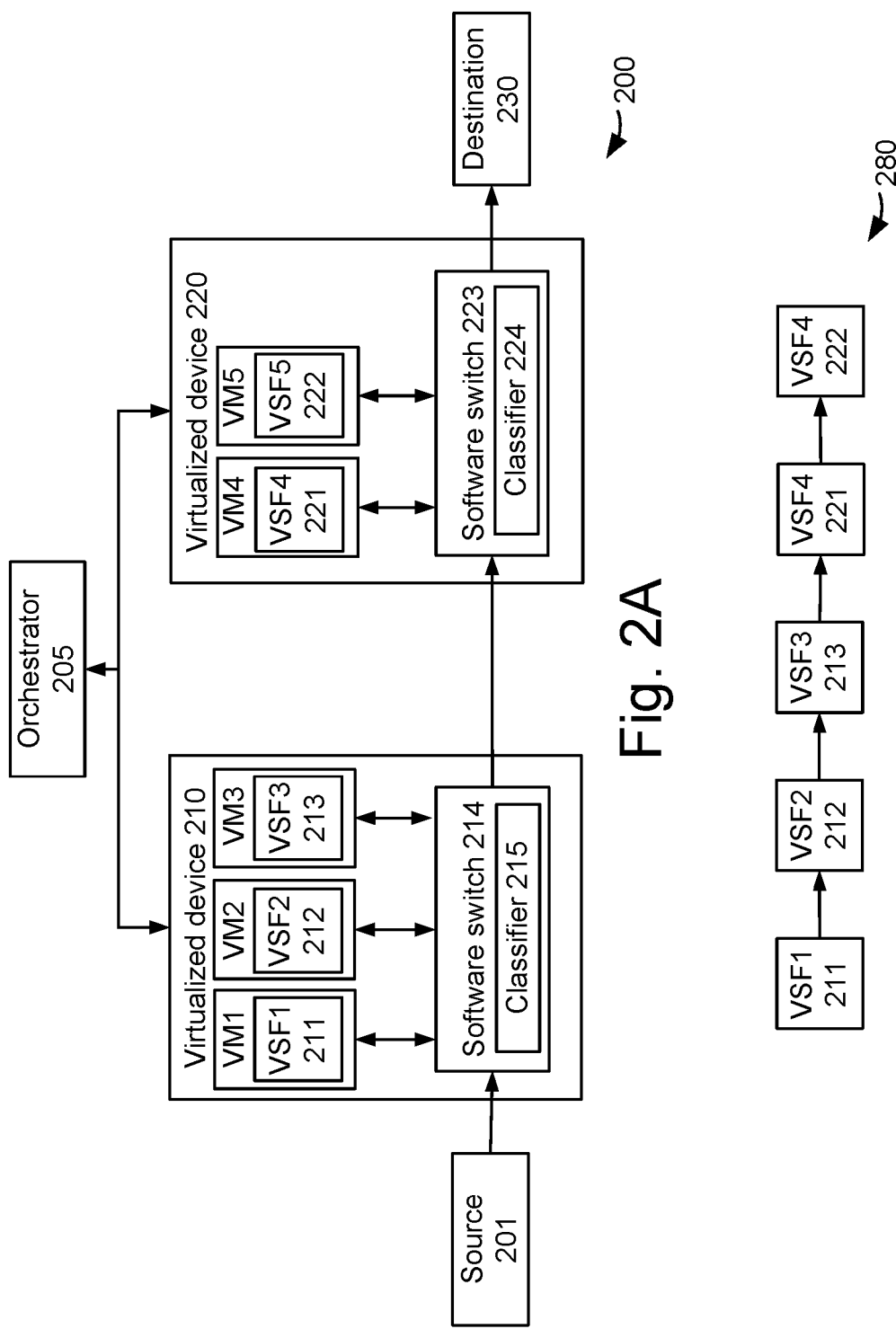

INTEGRATING PHYSICAL AND VIRTUAL NETWORK FUNCTIONS IN A SERVICE-CHAINED NETWORK ENVIRONMENT

BACKGROUND

Networks typically use various types of services functions in delivering services to end users. Examples of such functions include an intrusion detection service, an antivirus service, a spam filter, a firewall, a network address translation (NAT) service, a weighted cache controller, a quality of service (QOS) system, a virtual private network (VPN), a load balancer, a wide area network (WAN) optimizer and a parental control service.

BRIEF SUMMARY

Embodiment 1 is directed to a device comprising a non-transitory memory storage comprising instructions, and one or more processors in communication with the memory, wherein the one or more processors execute the instructions at a software switch to: determine that a packet is subject to processing by a chain of functions, the chain of functions comprising one or more virtual network functions (VNF) and one or more physical network functions (PNF), identify a next function in the chain of functions, forward the packet to the next function in the chain of functions, add a service function chain (SFC) header comprising an identifier of the chain of functions to the packet before forwarding the packet to the next function when the next function is a virtual network function among the one or more virtual network functions, and remove the SFC header from the packet before forwarding the packet to the next function when the next function is a physical network function among the one or more physical network functions.

Embodiment 2 is directed to embodiment 1, wherein the one or more processors execute the instructions at the software switch to: determine that the next function is one virtual network function among the one or more virtual network functions, and set a destination medium access control (MAC) address of the packet to an address of an input port of the one virtual network function and forward the packet to the one virtual network function.

Embodiment 3 is directed to embodiment 2, wherein the one or more processors execute the instructions at the software switch to: determine that the next function is the one virtual network function based on receiving the packet from another virtual network function in the chain of functions which precedes the one virtual network function.

Embodiment 4 is directed to any of embodiments 1 to 3, wherein the one or more processors execute the instructions at the software switch to: determine that the next function is a physical network function among the one or more physical network functions, and set a destination Medium Access Control (MAC) address of the packet to an address of an input port of the physical network function and forward the packet to the physical network function.

Embodiment 5 is directed to any of embodiments 1 to 4, wherein to determine that the packet is subject to processing by the chain of functions, that one or more processors execute the instructions at the software switch to determine that fields in an original header and/or payload of the packet match a specified set of fields.

Embodiment 6 is directed to embodiment 5, wherein the specified set of fields indicate the packet is from a specified source and is being sent to a specified destination.

Embodiment 7 is directed to embodiment 6, wherein the specified source comprises at least one of an Internet Protocol (IP) address, Medium Access Control (MAC) address or port, and the specified destination comprises at least one of an Internet Protocol (IP) address, Medium Access Control (MAC) address or port.

Embodiment 8 is directed to embodiment 5, wherein the specified set of fields indicate the packet is transmitted using a specified protocol.

Embodiment 9 is directed to embodiment 8, wherein the specified protocol comprises at least one of Transmission Control Protocol (TCP), User Datagram Protocol (UDP) or Internet Control Message Protocol (ICMP).

Embodiment 10 is directed to any of embodiments 1 to 9, wherein the one or more processors execute the instructions at the software switch to: set a destination medium access control (MAC) address of the packet to an address of the next function and forward the packet to the next function.

Embodiment 11 is directed to any of embodiments 1 to 10, wherein the one or more processors execute the instructions at the software switch to: remove the SFC header from the packet before forwarding the packet to the next function when the next function is the physical network function and a most recent function the packet was processed by is a virtual network function among the one or more virtual network functions.

Embodiment 12 is directed to any of embodiments 1 to 11, wherein the one or more virtual network functions are hosted on one or more virtualized devices, and the one or more physical network functions are hosted on one or more physical devices but not on a virtualized device.

Embodiment 13 is directed to a computer-implemented method for processing data comprising: with one or more processors, determining from an original header and/or payload of a packet that the packet is to be processed by a chain of functions, in response to the determining that the packet is to be processed by the chain of functions, determining that a next function in the chain of functions is a virtual network function, in response to the determining that the next function is the virtual network function, adding a service function chain (SFC) header comprising an identifier of the chain of functions to the packet and forwarding the packet to the virtual network function with the SFC header, after the forwarding the packet to the virtual network function with the SFC header, determining that a next function in the chain of functions is a physical network function, and in response to the determining that the next function is the physical network function, removing the SFC header and forwarding the packet to the physical network function without the SFC header.

Embodiment 14 is directed to embodiment 13, further comprising: with the one or more processors: after the forwarding the packet to the physical network function without the SFC header, receiving the packet from the physical network function and re-determining from the original header and/or payload of the packet that the packet is to be processed by the chain of functions by matching on a source MAC address in the original header of the packet, in response to the re-determining that the packet is to be processed by the chain of functions, determining that a next function in the chain of functions is another virtual network function, and in response to the determining that the next function in the chain of functions is the another virtual network function, adding the SFC header comprising the identifier to the packet and forwarding the packet to the another virtual network function with the identifier in the header.

Embodiment 15 is directed to embodiment 13, wherein the method further comprising, with the one or more processors: after the forwarding the packet to the physical network function without the SFC header, receiving the packet from the physical network function and re-determining from the original header and/or payload of the packet that the packet is to be processed by the chain of functions, in response to the re-determining that the packet is to be processed by the chain of functions by matching on a source MAC address in the original header, determining that a next function in the chain of functions is another physical network function, and in response to the determining that the next function is the another physical network function, forwarding the packet to the another physical network function without the SFC header.

Embodiment 16 is directed to any one of embodiments 13 to 15, wherein the method further comprising, with the one or more processors: after the forwarding the packet to the physical network function without the SFC header, receiving the packet from the physical network function and re-determining from the original header and/or payload that the packet is to be processed by the chain of functions by matching on a source MAC address, in response to the re-determining that the packet is to be processed by the chain of functions, determining that the packet has concluded processing by the chain of functions, and in response to the determining that the packet has concluded processing by the chain of functions, forwarding the packet to a destination which is identified in the original header.

Embodiment 17 is directed to a non-transitory computer-readable medium which stores computer instructions for processing data, that when executed by one or more processors, cause the one or more processors to perform the steps of: receiving a packet from a physical network function, determining from an original header and/or payload of the packet that the packet is to be processed by a chain of functions which includes the physical network function, in response to the determining that the packet is to be processed by the chain of functions, determining that a next function in the chain of functions is a virtual network function, in response to the determining that the next function is the virtual network function, forwarding the packet to the virtual network function, determining that the packet has concluded processing by the chain of functions, and in response to the determining that the packet has concluded processing by the chain of functions, forwarding the packet to a destination which is identified in the original header.

Embodiment 18 is directed to embodiment 17, wherein the destination of the packet is a virtualized device in a network, and the forwarding of the packet to the destination uses a software switch.

Embodiment 19 is directed to embodiment 17 or 18, wherein the determining that the packet has concluded processing by the chain of functions occurs at a software switch at a network node of a network, the destination of the packet is external to the network, and the forwarding of the packet to the destination uses a software router at the network node.

Embodiment 20 is directed to any of embodiments 17 to 19, wherein the determining that the packet has concluded processing by the chain of functions occurs at a software switch at a network node of a network, the virtual network function is hosted in a virtualized device in one subnet of the network, the destination of the packet is in another subnet of the network, and the forwarding of the packet to the destination uses a software router at the network node.

BRIEF DESCRIPTION OF THE DRAWINGS

Aspects of the present disclosure are illustrated by way of example and are not limited by the accompanying figures for which like references indicate elements.

FIG. 1A depicts an example network comprising physical service functions.

FIG. 1B depicts an example chain of physical service functions consistent with FIG. 1A.

FIG. 2A depicts an example network comprising virtual service functions.

FIG. 2B depicts an example chain of virtual service functions consistent with FIG. 2A.

DETAILED DESCRIPTION

Figure 3A:
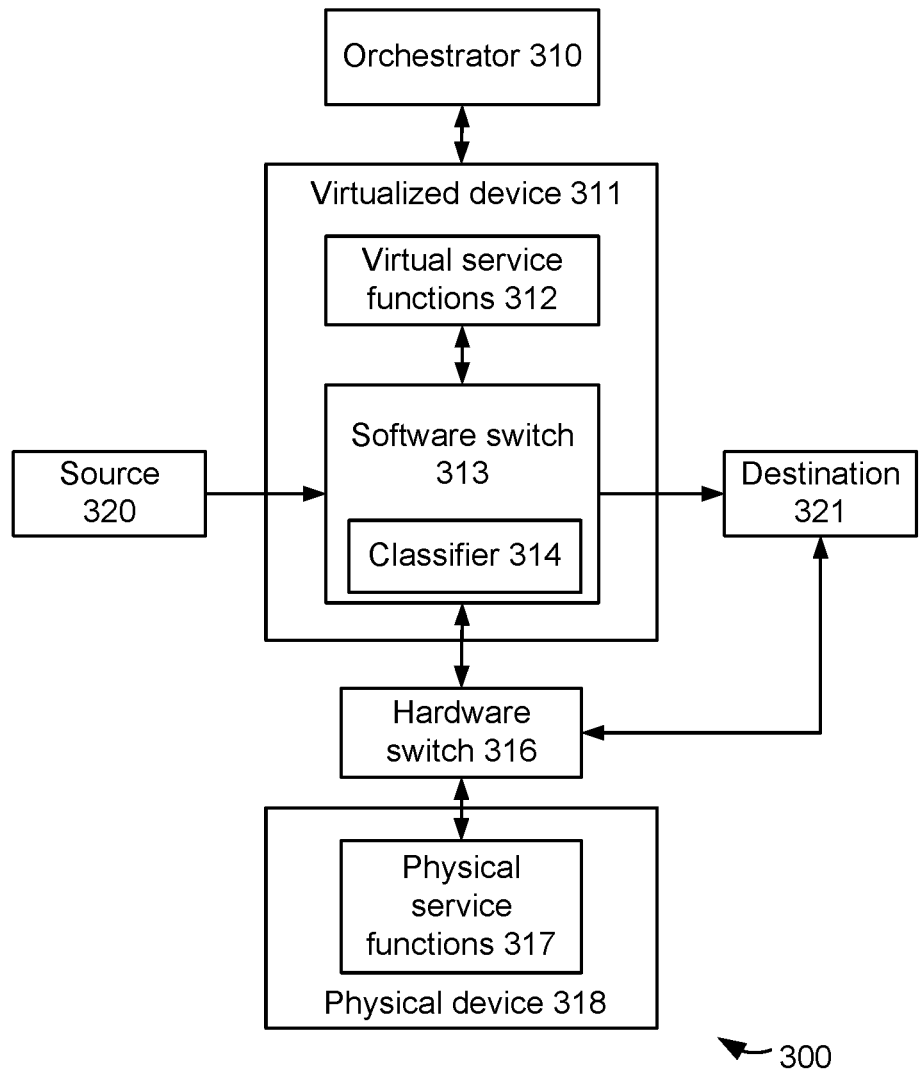
FIG. 3A depicts an example network comprising virtual and physical service functions according to an embodiment.

The disclosure relates to devices and techniques for integrating virtual and physical service functions in a computer network.

Service functions such as those mentioned at the outset have traditionally been provided using dedicated, standalone computing devices. The network operator would purchase these legacy devices from vendors and physically connect them to their network in order to process data using their service functions. Popular vendors of these devices include Cisco Systems Inc. and Palo Alto Networks Inc. However, these devices are expensive and contain proprietary software. Moreover, each device is typically directed to a single service function so that multiple devices are needed to perform multiple service functions. A service function is also referred to as a network function.

A recent trend is toward virtualization, in which a computing device (a virtualized device) hosts multiple virtualized machines. A virtualized device provides the functionality to execute an operating system. In the device, a hypervisor uses native execution to share and manage hardware, allowing for multiple environments which are isolated from one another, yet exist on the same physical device. A virtualized device can run the software of a standalone computing device to perform the associated service function. This approach provides advantages including cost and space savings and the ability to easily scale up to handle larger amounts of traffic.

However, in some cases the service function software is not available for use in a virtualized device. Moreover, network operators wish to maintain their investment in the standalone devices by continuing to use them.

Techniques provided herein allow for integrating virtual and physical service functions. Packets of data can be processed by a chain or sequence of service functions, one function at a time, where the service functions include both virtual and physical service functions. As a result, network operators can combine virtual and physical service functions while maintaining their investment in the standalone devices before adopting fully virtualized service functions.

In one approach, the original header and/or payload of a packet is analyzed at a software switch to determine whether the packet should be processed by the chain of service functions. If such processing is indicated, a next service function to process the packet is identified. The packet is then forwarded to a virtualized or physical device which implements the next service function. Once the packet is processed, it may be returned to the same software switch or forwarded to another software switch to determine a next service function in the chain to process the packet, or determine that the packet has concluded processing by the chain.

The original header of the packet may be modified to direct the packet to the next function, whether it is virtual or physical. Further, when forwarding the packet to virtual service functions, a SFC header with the chain identifier may be added to the packet. This SFC header with the chain identifier may be removed when forwarding the packet to physical service functions, which run their own proprietary software and do not recognize this identifier.

FIG. 1A depicts an example network 100 comprising physical service functions. In this example, three physical devices 110, 120 and 130 are provided. These devices are computing devices such as servers which do not host virtual machines. The physical devices are sometimes referred to as bare metal servers or non-virtualized devices or devices which do not implement a virtual machine. Each physical device hosts a respective physical service function (PSF) and is associated with a hardware switch. In one approach, the hardware switch is a top-of-rack switch in a data center. The hardware switch can be connected to multiple physical devices in a rack and connect these devices to a network. The physical devices 110, 120 and 130 hosts physical service functions PSF1 111, PSF2 121 and PSF3 131, respectively, and are associated with hardware switches 112, 122 and 132, respectively. A source computing device 101 generates a series of data packets which are first communicated to the physical device 110 via the hardware switch 112 for processing by PSF1. The packets are then forwarded by the hardware switch 112 to the physical device 120 via the hardware switch 122 for processing by PSF2. The packets are then forwarded by the hardware switch 122 to the physical device 130 via the hardware switch 132 for processing by PSF3. After the processing by the last service function, the packets are forwarded by the hardware switch 132 to the destination computing device 140. Each hardware switch may be configured to direct incoming traffic to the associated physical device and to direct outgoing traffic from the associated physical device to the next hardware switch.

FIG. 1B depicts an example chain 150 of physical service functions PSF1 111, PSF2 121 and PSF3 131 which is provided by the network of FIG. 1A. A chain generally comprises multiple service functions, where data is processed one service function at a time in a specified order. The processing of the data depends on the purpose of the service function. The processing could result in the data being blocked from reaching the destination, delayed in reaching the destination, or being modified, for instance. The processing could also result in changing the payload of a packet such as in the case of inserting an HTTP header.

FIG. 2A depicts an example network 200 comprising virtual service functions. In this example, two virtualized devices 210 and 220 are provided. Generally, virtual service functions can be run on respective virtual machines which are hosted on one or more virtualized devices. A virtualized device represents a physical device which hosts virtual machines. Each virtualized device hosts multiple virtual service functions (VSF) and is associated with a software switch, in this example. This switch is implemented by software within a server and can forward packets within the virtualized device, or to another virtualized or physical device. The switch thus can act as a router. In one approach, the software switch uses an open source standard such as Open vSwitch (OVS) which provides a multilayer virtual switch. Further, the software switch includes a classifier which analyzes the header and/or payload information of a packet. The header and/or payload information may indicate, e.g., that the packet should be forwarded to a next service function in a chain or that the packet is subject to processing by a chain of service functions. The VSFs and software switches may be configured by an orchestrator device 205. For instance, this can be a computing device with a user interface which a human operator uses to deploy specific VSFs to specific virtualized devices, and to configure the classifiers and switches to implement a specified chain of service functions for specified types of packets.

The virtualized device 210 includes virtual service functions (VSF) VSF1 211, VSF2 212 and VSF3 213 which are hosted on (e.g., run or execute on) virtual machines VM1, VM2 and VM3, respectively, and a software switch 214 with a classifier 215. The virtualized device 220 includes virtual service functions VSF4 221 and VSF5 222 which are hosted on virtual machines VM4 and VM5, respectively.

A source 201 communicates packets to the software switch 214. The classifier determines whether each packet is to be processed by a service function chain. Additionally, if a packet is to be processed by a service function chain, a next function in the chain is determined. The packet is then forwarded by the software switch to the next service function in the chain. After processing, the packet is returned to the software switch by the VSF and a next service function in in the chain is identified. The next service function may be in the same virtualized device or in another virtualized device, in this example. A packet is processed by VSF1, then VSF2 and then VSF3 in the virtualized device 210. The packet is then forwarded to the software switch 223 at the virtualized device 220 for processing by VSF4 221 and VSF5 222 at VM4 and VM5, respectively. After processing by the last service function in the chain, VSF5, the packet is forwarded to a destination 230. The software switch 223 includes a classifier 224 similar to the classifier 215. Note that the source and destination can be at respective virtual machines in the virtualized devices 210 and 220, respectively, in one approach. Or, the source and/or destination can be at different virtualized or physical devices.

FIG. 2B depicts an example chain 280 of virtual service functions VSF1 211, VSF2 212, VSF3 213, VSF4 221 and VSF5 222.

FIG. 3A depicts an example network 300 comprising virtual and physical service functions according to an embodiment. As mentioned, various advantages can be achieved by integrating both virtual and physical service functions in a common chain of functions. Generally, the chain can include one or more virtual service functions at one or more virtualized devices and one or more physical service functions at one or more physical devices. In this example, a virtualized device 311 hosts virtual service functions 312 such as VSF1 211 and VSF3 213 in FIG. 2A, and a physical device hosts physical service functions 317 such as PSF2 121 in FIG. 1A. The virtualized device 311 includes a software switch 313 with a classifier 314, and the physical device 318 is associated with a hardware switch 316.

A packet from a source 320 is provided to the software switch and classified by the classifier as being subject to processing by a chain of functions. The classifying may be based on information in the header of the packet such as source and destination addresses, source and destination ports and protocol. The software switch may forward the packet to the virtual service functions and then to the physical service functions. In another approach, the software switch may forward the packet to one virtual service function, e.g., VSF1, then to a physical service function, e.g., PSF2 and then to another virtual service function, e.g., VSF3. Other variations are possible as well. For example, the software switch may forward the packet initially to a physical service function and then to a virtual service function. After processing by the service functions, the packet is forwarded to a destination 321.

An orchestrator 310 configures the software switches of one or more virtualized devices with information for classifying and forwarding packets. Examples of such information are provided in the tables of FIGS. 6B and 7B.

Figure 3B:
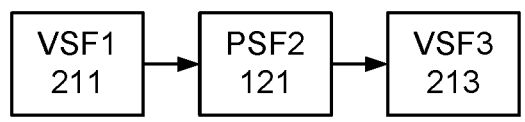
FIG. 3B depicts an example chain of virtual and physical service functions consistent with FIG. 3A.

FIG. 3B depicts an example chain 380 of virtual and physical service functions VSF1 211, PSF2 121 and VSF3 213, consistent with FIG. 3A.

Figure 4A:
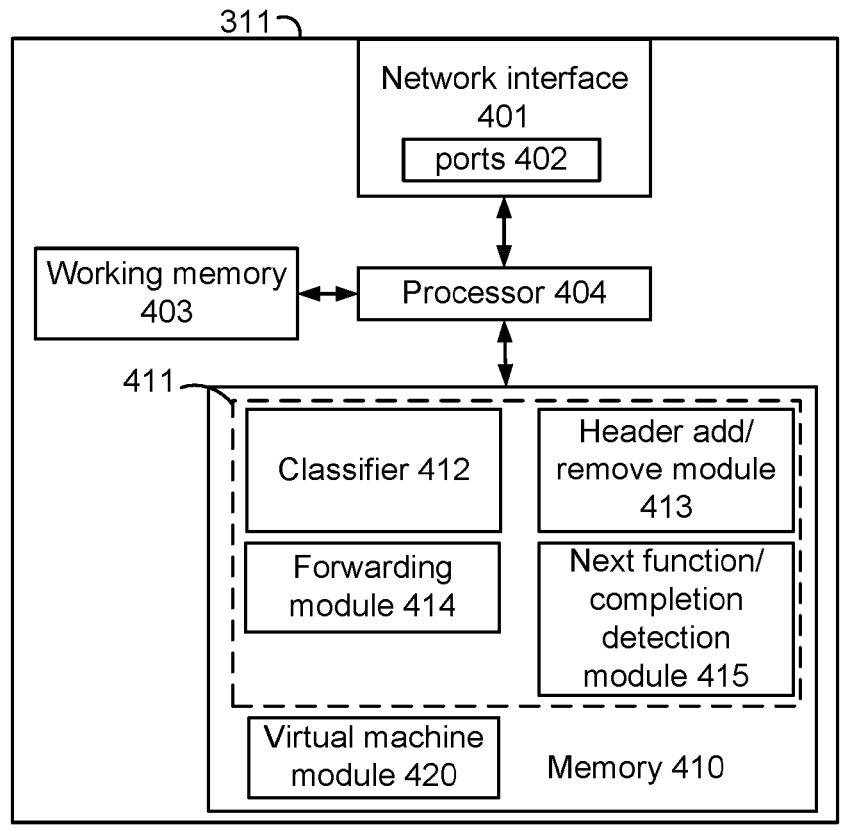
FIG. 4A is a diagram of the virtualized device of FIG. 3A according to an embodiment.

FIG. 4A is a diagram of the virtualized device 311 of FIG. 3A according to an embodiment. The device includes a network interface 401 including ports 402. The network interface may communicate using the Ethernet standard, for example. Ethernet is a local area network (LAN) technology which describes how networked devices can format data for transmission to other network devices. Ethernet transmissions use a packet which includes a header and a payload. The header includes information such as a Media Access Control (MAC) destination address and source address, in addition to error-checking data. The network interface may be a network interface controller card comprising ports. Communication cables, such as CAT5 cables, may plug into the physical ports.

The device further includes a processor 404 which may be a microprocessor or other implementation of a processing unit. The device further includes a working memory 403 and a memory 410.

The processor communicates with the network interface, working memory and memory 410. The memory 410 may be non-volatile storage for software (code) which is loaded into the working memory 403 and executed by the processor 404 to perform the functions described herein. The working memory may be a volatile memory, e.g., RAM.

Figure 4B:
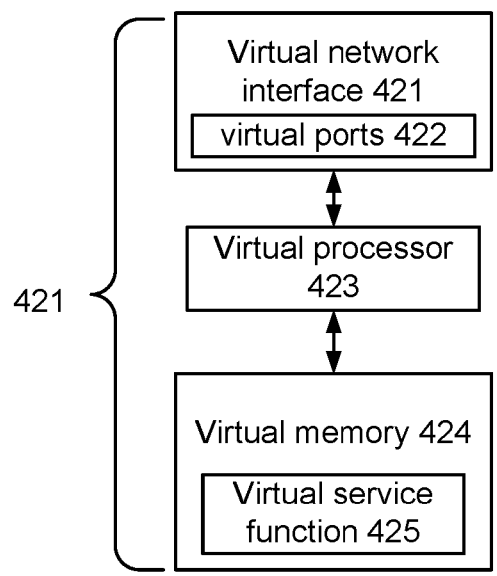
FIG. 4B is a diagram of a virtual machine provided by the virtual machine module 420 of FIG. 4A according to an embodiment.

The memory 410 includes a set of modules 411 including a classifier 412, a header add/remove module 413, a forwarding module 414 and a next function/completion detection module 415. The classifier module determines whether a packet is subject to processing by a chain of functions. This can involve determining if there is a match between data fields in the header and/or payload such as source and destination address and protocol to specified values of source and destination address and protocol. The header add/remove module may add or remove a SFC header with the chain ID from a packet, and set a destination MAC address in the original header of a packet. The forwarding module routes a packet to a next virtual or physical service function or to a destination device. The next function/completion detection module determines a next function in a chain to process a packet, or determines that processing by a chain is completed. For example, see the tables of FIGS. 6B and 7B. The memory also includes a virtual machine module 420 which provides a virtual machine as depicted in FIG. 4B.

Figure 4C:
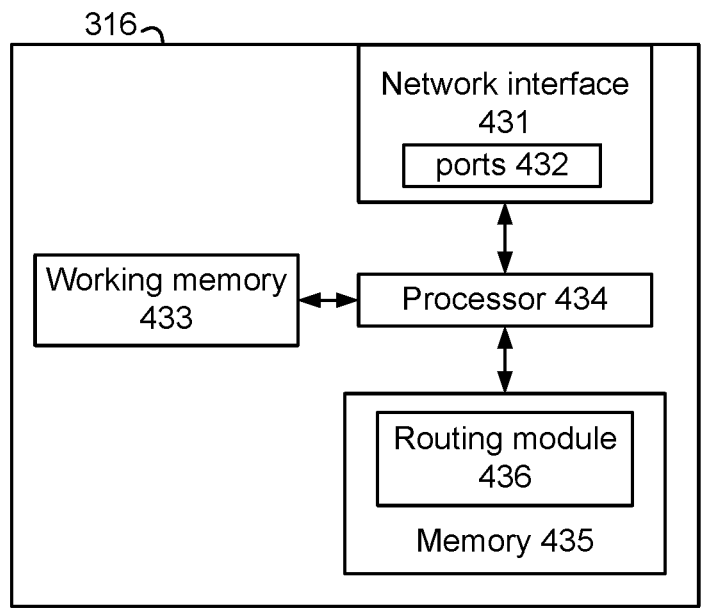
FIG. 4C is a diagram of the hardware switch of FIG. 3A according to an embodiment.
Figure 4D:
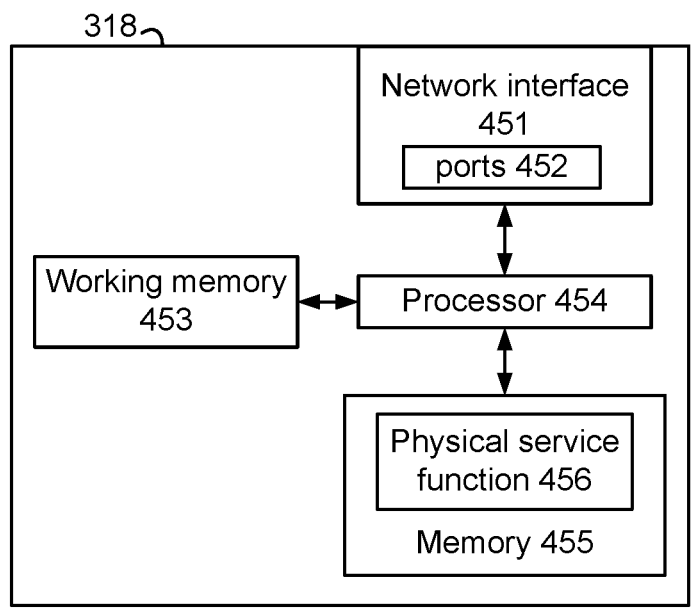
FIG. 4D is a diagram of the physical device of FIG. 3A according to an embodiment.

In FIGS. 4A, 4C and 4D, the memories and working memories may comprise computer-readable non-transitory media. Such media can include all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Various computing devices may utilize all of the components shown, or only a subset of the components, and levels of integration may vary from device to device. Furthermore, a device may contain multiple instances of a component, such as multiple processing units, processors, memories, transmitters, receivers, etc. The data source may comprise a hardware storage device which stores samples of data which are to be processed. The processors may be any type of electronic data processor such as a CPU. The input/output devices may include network interfaces, storage interfaces, monitors, keyboards, pointing devices and the like. A working memory may store code, e.g., instructions which are executed by a processor to carry out the functions described herein. The code may be stored in a non-volatile memory and loaded into the working memory.

The memory/storage devices may comprise any type of system memory such as static random access memory (SRAM), dynamic random access memory (DRAM), synchronous DRAM (SDRAM), read-only memory (ROM), a solid state drive, hard disk drive, a magnetic disk drive, or an optical disk drive. The memory devices may include ROM for use at boot-up, and DRAM for program and data storage for use while executing programs. The memory devices may include non-transitory, hardware memory devices.

FIG. 4B is a diagram of a virtual machine 421 or VM provided by the virtual machine module 420 of FIG. 4A according to an embodiment. The virtual machine includes virtual, or software-implemented, components which have similar functions as the corresponding hardware components. For example, the VM includes a virtual memory 424 which includes software for a virtual service function 425. A virtual processor 423 is also provided. A virtual network interface 421 includes virtual ports 422.

FIG. 4C is a diagram of the hardware switch 316 of FIG. 3A according to an embodiment. The hardware switch includes a network interface 431 including ports 432. The hardware switch further includes a processor 434, a working memory 433 and a memory 435. The processor communicates with the network interface, working memory and memory 435. The memory 435 may be non-volatile storage for software which is loaded into the working memory and executed by the processor to perform the functions described herein. The memory 435 includes a routing module 436 for routing packets to other computing devices, such as a virtualized device and a physical device. In one approach, the destination for routing a packet id identified by an Internet Protocol (IP) destination address in a header of the packet.

FIG. 4D is a diagram of the physical device 318 of FIG. 3A according to an embodiment. The device includes a network interface 451 including ports 452. The device further includes a processor 454, a working memory 453 and a memory 455. The processor communicates with the network interface, working memory and memory 455. The memory 455 may be non-volatile storage for software which is loaded into the working memory and executed by the processor to perform the functions described herein. The memory 455 also includes physical service function module 456 for processing a packet in a chain of service functions.

Figure 5A:
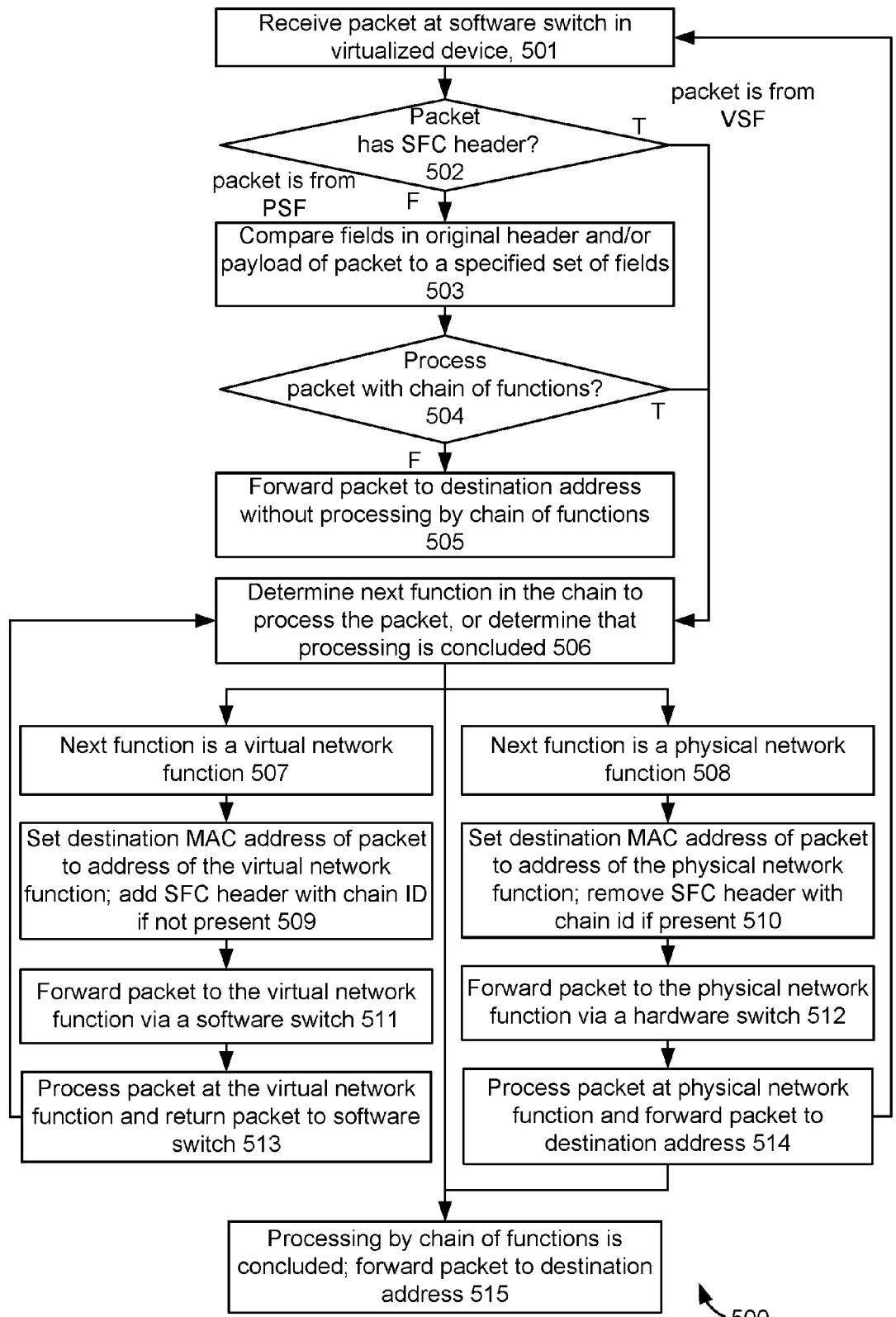
FIG. 5A a flowchart of a method for processing a packet of data using virtual and physical service functions, according to an embodiment.

FIG. 5A a flowchart 500 of a method for processing a packet of data using virtual and physical service functions, according to an embodiment. The process may be carried out at one or more virtualized devices, for example. In one approach, the process is carried out by software switches at the virtualized devices. Step 501 includes receiving a packet at a software switch in a virtualized device. A decision step 502 determines whether the packet has an SFC header with a chain identifier (ID). A SFC header with the chain ID may be added to a packet when the packet is forwarded to virtual service functions, after the packet has been identified as being subject to processing by the identified chain of functions. In some cases, different chains of functions are available for processing different packets based on specified criterion. For example, a parental control function may process some packets but not others. Thus, different packets can be processed by different chains. Moreover, there can be common functions in the different chains. The chain ID identifies a specified chain of functions used for processing a particular packet.

If decision step 502 is false, step 503 compares fields in the original header and/or payload of the packet to a specified set of fields. This is the task of the classifier. The specified set of fields may indicate the packet is from a specified source and is being sent to a specified destination. For example, the specified source may comprise at least one of an Internet Protocol (IP) address, Medium Access Control (MAC) address or port, and the specified destination may comprise at least one of an Internet Protocol (IP) address, Medium Access Control (MAC) address or port. For instance, step 503 may determine if source and destination IP addresses in the header match specified source and destination IP addresses, respectively. Or, step 503 may determine if a source IP address and destination MAC address in the header match a specified source IP address and destination MAC address, respectively. Various other combinations of matching may be used as well. The specified set of fields may also indicate the packet is transmitted using a specified protocol, such as at least one of Transmission Control Protocol (TCP), User Datagram Protocol (UDP) or Internet Control Message Protocol (ICMP).

Decision step 504 determines whether to process the packet with a chain of functions, e.g., whether there is a match in the comparison of step 503. If decision step 504 is true, the packet is from a PSF, and step 506 determines the next function in the chain to process the packet, or determines that processing is concluded so that there is no such next function. The next function is determined based on the most recent function which processed the packet and the chain ID, if present. If there is no such most recent function, the packet should be processed by the first function in the chain. If there is a most recent function, the packet should be processed by the next function which follows the most recent function in the chain. The most recent function can be identified by the source address or port of the packet, for instance.

After step 506, one of three branches may be followed. In a first branch, step 507 determines that the next function is a virtual network function. Step 509 sets a destination MAC address of the packet to an address of the virtual network function. This step may also add a SFC header with the chain ID to the packet if the SFC header is not already present. Step 511 forwards the packet to the virtual network function via a software switch, using the destination MAC address. The forwarding may occur at a data link layer. Step 513 processes the packet at the virtual network function and returns the processed packet to the software switch. In one approach, a specified input port and output port (a port pair) are associated with a virtual network function. The packet is received by the VNF at the specified input port and returned via the specified output port. The virtual machine which runs the VNF may set a source address in the original packet header so that the packet received at the software switch from the VNF can be identified as being from the VNF. After step 513, step 506 is executed again to determine a next function in the chain or to determine that processing is concluded.

In a second branch after step 506, step 515 is reached where processing by the chain of functions is concluded, and the packet is forwarded to the destination address.

In a third branch after step 506, step 508 determines that the next function is a physical network function. Step 510 sets a destination MAC address of the packet to an address of the physical network function. This step may also remove a SFC header with a chain ID from the packet if the SFC header is present. This is done because the hardware switch which the packet is forwarded to is a legacy, proprietary device which does not recognize the chain ID. Step 512 forwards the packet to the physical network function via a hardware switch, using the destination MAC address. Step 514 processes the packet at the physical network function and forwards the packet to the destination address. For example, this could be an IP destination address. This is the expected behavior of the legacy hardware switch. This forwarding may occur at a network layer, above the data link layer.

Figures 6A, 6B:
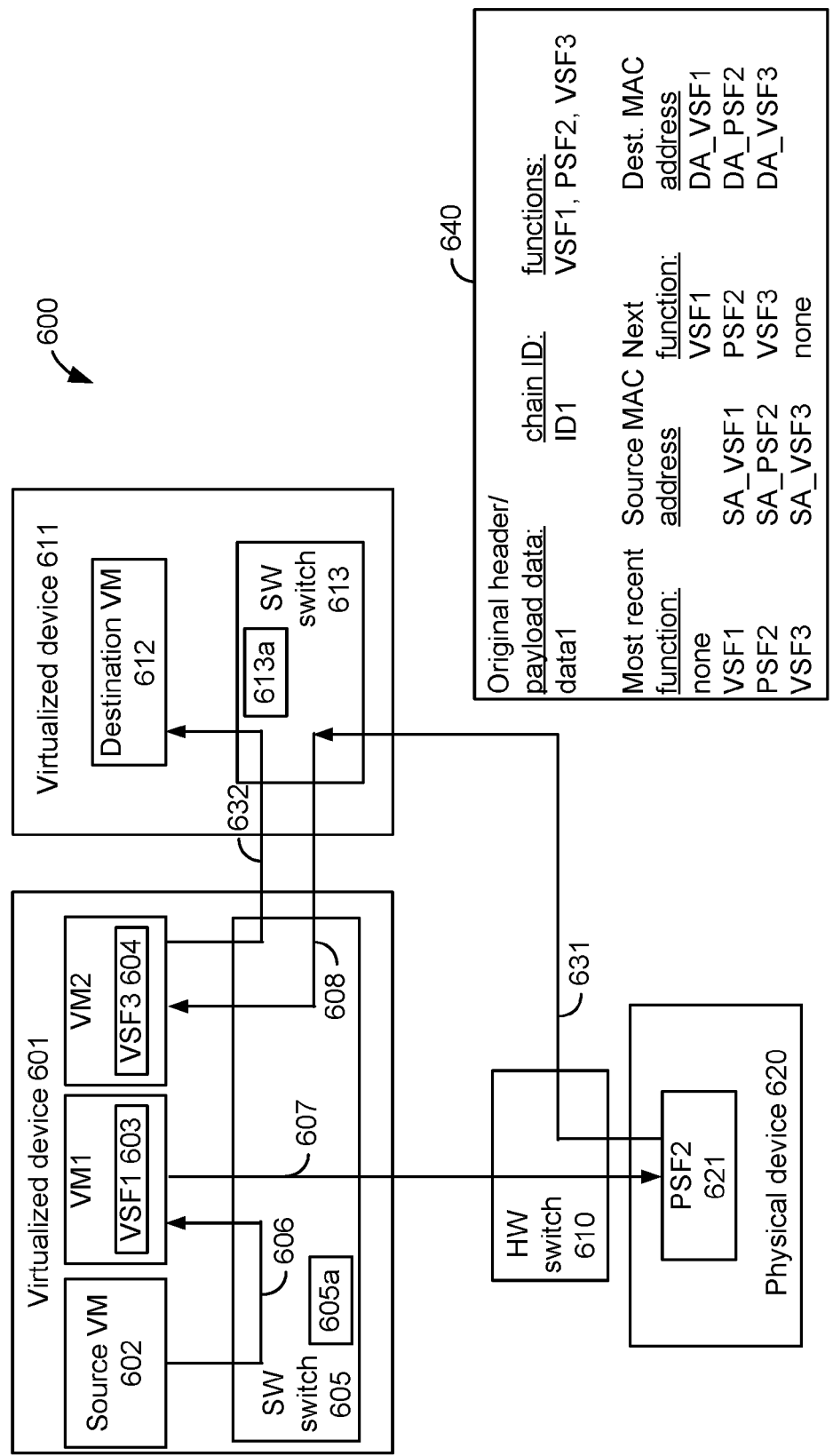
FIG. 6A depicts an example network for implementing the process of FIG. 5A, where two virtualized devices, one physical device and one hardware switch are provided, according to an embodiment.
FIG. 6B depicts an example table of data indicating original header and/or payload data, and a corresponding chain identifier (ID) and chain of functions, consistent with FIG. 6A.

Subsequently, either processing by the chain of functions is concluded at step 515 or step 501 is executed again to receive the packet at a software switch in a virtualized device at the destination address. This can be the same software switch used in the previous iteration of step 501 or a different software switch. For example, FIG. 6A shows a network in which a software switch 605 in one virtualized device 601 processes a packet according to a first iteration of step 501, and a software switch 613 in another virtualized device 611 processes the packet according to a second iteration of step 501.

If decision step 502 is true, the packet is from a VSF, and step 506 is reached. The chain ID can be used to directly lookup the chain of functions, such as from a table (see FIGS. 6B and 7B) and determine the next function or determine that processing is concluded. If decision step 504 is false, step 505 is reached. This step forwards the packet to the destination address without processing by a chain of functions. In this case, the packet did not meet the criterion at step 503 for being processed by a chain of functions.

The presence of the SFC header and chain ID in a packet allows a software switch to determine quickly that the packet is subject to processing by a specified chain of functions. This determination can be made with minimal use of computing resources and allows the packet to be quickly routed to a next hop/service function. In theory, instead of using the SFC header and chain ID, the software switch could re-determine that the packet is subject to processing by a specified chain of functions by matching data fields in the original header and/or payload to a specified set of fields. However, this approach uses more computing resources since this re-determination would be made at each hop of the packet, e.g., each time the software switch handles the packet.

Figure 5B:
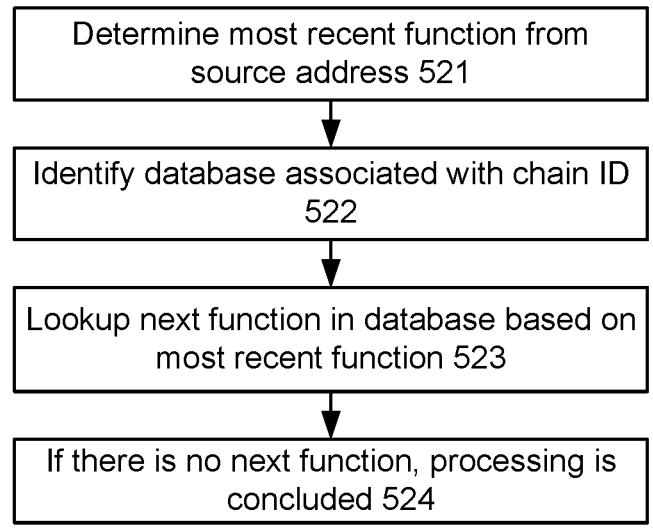
FIG. 5B is a flowchart of an example implementation of step 506 of FIG. 5B, according to an embodiment.

FIG. 5B is a flowchart of an example implementation of step 506 of FIG. 5B, according to an embodiment. Step 506 determines the next function in the chain to process the packet, or determines that processing is concluded so that there is no such next function. In one approach, step 521 determines the most recent function from the source address, such as a source IP address, source MAC address and/or source port. This source address may be a source MAC address of a VM or physical machine, for instance. Step 522 identifies a database associated with the chain ID. Examples include the tables of FIGS. 6B and 7B. Step 523 looks up a next function in a database based on a most recent function. At step 524, if there is no next function, the processing is concluded.

Figure 5C:
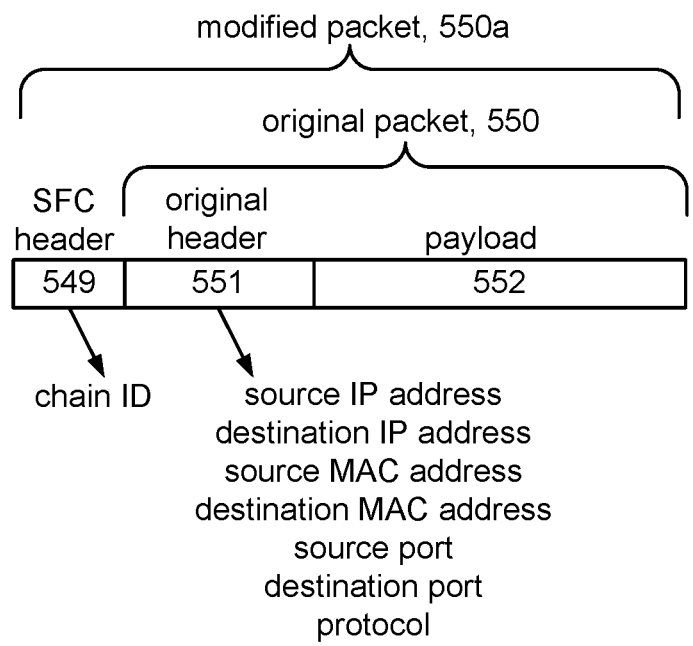
FIG. 5C depicts an example packet of data, according to an embodiment.

FIG. 5C depicts an example packet of data, according to an embodiment. An original packet 550 of data is generated by a source computing device such as a source VM. An example original packet follows an Ethernet format. The original packet 550 includes an original header 551 and a payload 552. The original header 551 includes data such as a source IP address, a destination IP address, a source MAC address, a destination MAC address, a source port identifier, a destination port identifier and a protocol identifier. The original header is provided at the time the original packet is created. In some cases, an additional header referred to as an SFC header 549 is added to the original packet to provide a modified packet 550a. The SFC header 549 includes a chain identifier (ID), as discussed herein. As mentioned, the SFC header 549 including the chain ID may be present or absent in a packet at various times in the processing by a chain of service functions. Also, the destination MAC address can be set to forward the packet to a next service function whether it is virtual or physical. By adding a separate SFC header, the original header can be maintained. Even when the original header is modified such as to set a MAC destination address, the modification is made to an existing field in the original header so the structure of the original header is maintained. Existing software processes that read the original header and recognize its fields can therefore operate normally.

FIG. 6A depicts an example network 600 for implementing the process of FIG. 5A, where two virtualized devices, one physical device and one hardware switch are provided, according to an embodiment. In the network 600, one virtualized device 601 includes a source VM 602, a virtual machine VM1 which hosts a virtual service function VSF1 603, a virtual machine VM2 which hosts a virtual service function VSF3 604, and a software switch 605. Another virtualized device 611 includes a destination VM 612 and a software (SW) switch 613. The source VM is a virtual machine which generates packets of data and the destination VM is a virtual machine which is the intended recipient of the packets. However, before the destination VM receives the packets, they are subject to processing by a chain of service functions. The network also includes a physical device 620 which hosts a physical service function PSF2 and is associated with a hardware (HW) switch 610.

The software switches may be configured with the table 640 of FIG. 6B which identifies the chain of functions and related information for forwarding packets.

A packet generated by the source VM is provided to the SW switch 605 in a path 606. When the SW switch receives the packet, it determines that no chain ID is present. In response, it further determines (using the classifier 605a) that the packet should be processed by a specified chain of functions such as VSF1, PSF2 and VSF3 as set forth in the table 640. Further, the SW switch determines that the next function, which is the first function in the chain, is VSF1. The SW switch sets the destination MAC address of the packet to an address of an input port of the virtual network function (e.g., sets the address to DA_VSF1) and forwards the packet to VSF1 at VM1 using this address. VM1 processes the packet and returns it to the SW switch 605 in a path 607. The SW switch 605 determines that the chain ID is present. The SW switch can therefore directly determine the next function and there is no need for the classifier to re-determine that the packet should be processed by a specified chain of functions.

The SW switch 605 determines that the next function, which is the second function in the chain, is PSF2. The SW switch sets the destination MAC address of the packet to an address of an input port of the physical network function (e.g., sets the address to DA_PSF2) and forwards the packet to PSF2 at the physical device 630 using this address. The hardware switch routes the packet to the physical device. The physical device processes the packet and forwards it to the virtualized device 611, e.g., based on a destination IP address of the packet.

The software switch 613 receives the packet via a path 631 and performs a similar analysis of the header and/or payload (using the classifier 613a) as is done by the software switch 605 on the packet received from the source VM. The software switch 613 determines that the packet should be processed by the specified chain of functions. Further, the source MAC address of the packet indicates it is received from PSF2, so that the next function is VSF3. The classifier 613a matches on the source MAC address of packets returned from a PSF to identify the PSF. Together with the matching on the fields of the original header and/or payload to re-determine that the packet is subject to processing by a specific chain of functions, a next hop function in the chain is determined and the packet is forwarded to the next function in the chain. The SW switch 613 sets the destination MAC address of the packet to an address of an input port of the virtual network function VSF3 (e.g., sets the address to DA_VSF3) and forwards the packet to VSF3 at VM2 using this address. VM2 processes the packet and returns it to the SW switch 613 in a path 632. The SW switch then determines that processing of the packet by the chain is concluded and forwards the packet to the destination VM 612. The SW switch 613 may set the destination MAC address of the packet to an address of an input port of the destination VM.

In one approach, the virtual service functions reside on the virtualized servers, which are computing nodes in a virtual (overlay) network. The hardware switch 610, as a physical router, does not know about the virtual network and thus cannot intercept or redirect traffic between the physical service functions and devices connected to the virtual network. One way to integrate the physical devices with the virtualized devices in the virtual network uses the L2 Gateway (L2GW). This is an API framework for OpenStack (an open source cloud computing software) that bridges two or more networks together to make them look at a single broadcast domain. L2GW can be used for bridging a virtual network with a physical network. L2 refers to level 2 (the data link layer) of the Open System Interconnection (OSI) model.

L2 agents can communicate with hardware VTEPs through two databases (OVSDB and HW_VTEP) to seamlessly integrate the physical and virtual networks. A VTEP is a VXLAN tunnel endpoint. VXLAN is a Virtual Extensible Local Area Network—a network virtualization technology. OVSDB is the Open vSwitch Database, a management protocol in a software-defined networking (SDN) environment. Open vSwitch is an open-source software switch designed to be used as a virtual switch with Linux-based hypervisors.

Moreover, in an example implementation, OpenStack Neutron can be used to allow physical devices to communicate to the virtual network using the L2GW agent. OpenStack Neutron is an SDN networking project focused on delivering networking-as-a-service (NaaS) in virtual compute environments. The physical devices are connected to hardware VTEP switches. Examples of such switches include the model 56000 from Dell Inc. and the model 7000 from Arista Newtworks Inc. These switches use proprietary hardware and software, and their only interface to the outside world is through the OVS database and the HW_VTEP database. Service chaining a physical device connected to a port on one of these HW VTEPs would require the packets to be intercepted at the physical port and then redirected as needed. However, this is not possible due to the architecture and proprietary nature of HW VTEP switches. The techniques provided herein accommodate these limitations while still enabling chaining of virtual and physical service functions.

One aspect of the techniques involves intercepting the packets sent from the physical network functions (attached to the HW VTEP devices) on the compute or network nodes (e.g., virtualized device 611) which host the final IP destination address of the packet and forwarding the packets to the next service function in a chain. The L2 hardware switch can use the destination IP address of the packet to route the packet over a VxLAN tunnel to the compute node that hosts the destination VM 612. The classifier 613a can then implement a rule to match the source MAC address of the packet (the source MAC address of the physical device 630) and optionally other data in the header and/or payload to determine if the packet is from a physical service function on a physical server and if it requires further processing in the service chain. If the packet is from a physical service function and requires further processing, the classifier re-classifies the packet, adds the SFC header with the chain ID to the packet and forwards the modified packet to the next service function. Otherwise, the packet is forwarded to the destination VM. The classifier 613a determines that the packet on path 631 is from PSF2 because the source MAC address of the packet is from the physical device 630.

FIG. 6B depicts an example table 640 of data indicating original header and/or payload data, and a corresponding chain identifier (ID) and chain of functions, consistent with FIG. 6A. The original header and/or payload data is data1 and can include information such as in FIG. 5C, e.g., source IP address, a destination IP address, a source MAC address, a destination MAC address, a source port identifier, a destination port identifier and a protocol. Data1 is classified as being associated with a chain of functions having an identifier of ID1. The chain comprises service functions in the sequence of: VSF1, PSF2, VSF3.

The table also depicts a cross-referenced list for the chain of a most recent function, a source address of the most recent function, a next function and a destination address of the next function. The source and destination addresses may be MAC addresses, for example. MAC addresses are used in layer 2 of the OSI model. Layer 2 can involve Ethernet communications.

The first row of the list indicates that when there is no most recent function, the next function in the chain is VSF1 having a destination address of DA_VSF1. The second row of the list indicates that when VSF1 is the most recent function, as identified by the source address of SA_VSF1, the next function in the chain is PSF2 having a destination address of DA_PSF2. The third row of the list indicates that when PSF2 is the most recent function, as identified by the source address of SA_PSF2, the next function in the chain is VSF3 having a destination address of DA_VSF3. The fourth row of the list indicates that when VSF3 is the most recent function, as identified by the source address of SA_VSF3, there is no next function in the chain.

Figures 7A, 7B:
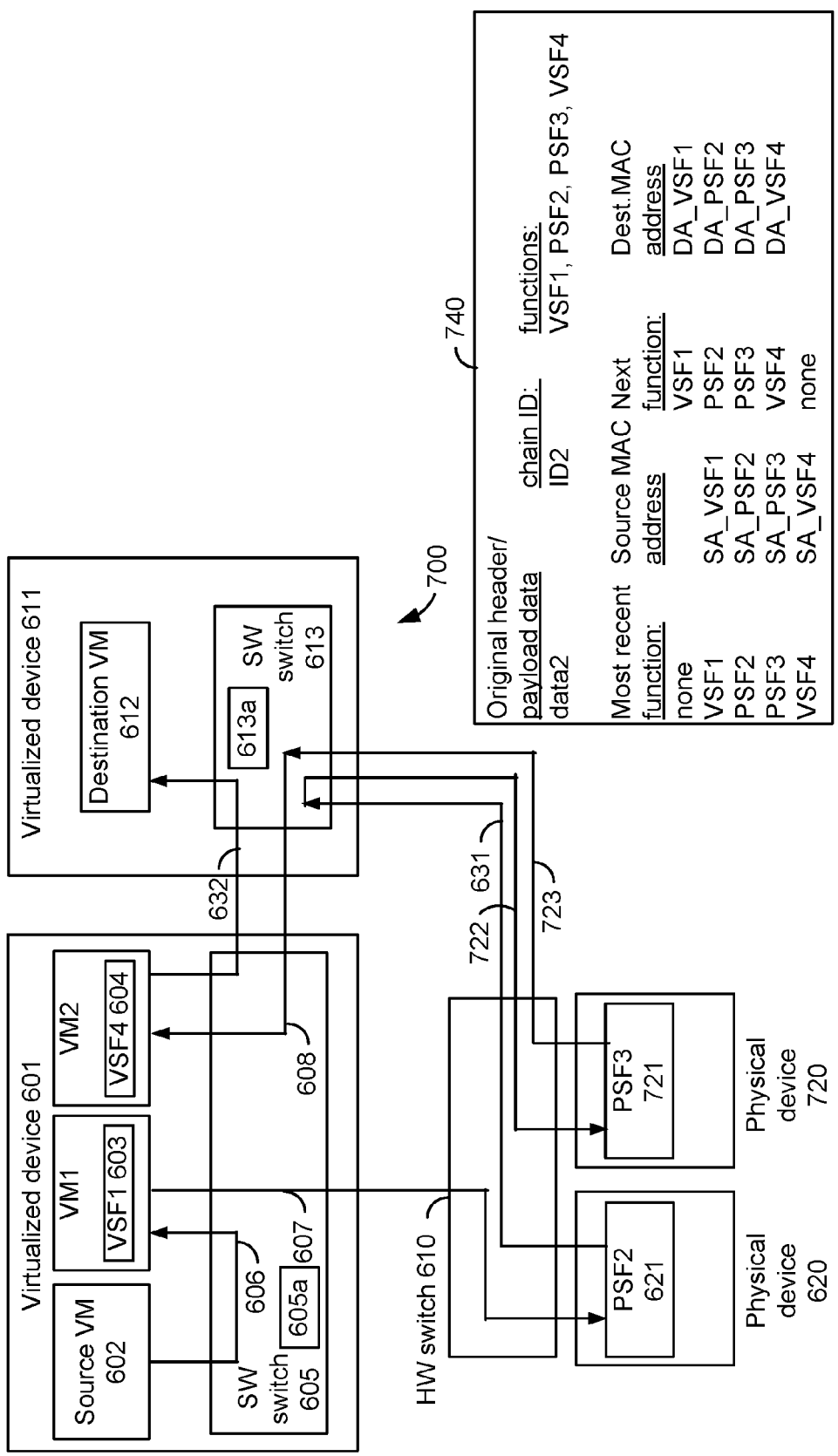
FIG. 7A depicts an example network for implementing the process of FIG. 5A, where two virtualized devices, two physical devices and one hardware switch are provided, according to an embodiment.
FIG. 7B depicts an example table of data indicating original header and/or payload data, and a corresponding chain identifier (ID) and chain of functions, consistent with FIG. 7A.

FIG. 7A depicts an example network 700 for implementing the process of FIG. 5A, where two virtualized devices, two physical devices and one hardware switch are provided, according to an embodiment. In the example of FIG. 6A, the SW switch 613 forwarded a packet from a physical device to a virtual service function. In this example, the SW switch 613 first forwards a packet from a first physical device (e.g., physical device 620 hosting PSF2 621) to a second physical device (e.g., physical device 720 hosting PSF3 721) before forwarding the packet from the second physical device to a virtual service function. Moreover, the packets are forwarded to and from the physical devices using a common HW switch 610.

A packet from the source VM is processed on path 606 by forwarding it to VSF1 603. When the SW switch receives the packet back from VSF1 on path 607 it forwards the packet to PSF2 via the HW switch 610, with the chain ID removed. The physical device 620 hosting PSF2 forwards the packet on a path 631 to the SW switch 613 based on an IP destination address of the packet. The SW switch determines that the next function in the chain is PSF3 based on receiving the packet from a MAC address of physical device 620 (and knowing this address is associated with PSF2), and forwards the packet to PSF3 via the HW switch 610 on a path 722. The chain ID is not used in this forwarding. The physical device 720 hosting PSF3 forwards the packet on a path 723 to the SW switch 613 based on the IP destination address of the packet. The SW switch 613 determines that the next function in the chain is VSF4 based on receiving the packet from a MAC address of physical device 720 (and knowing this address is associated with PSF3), and forwards the packet to VSF4 (with the chain ID) via the SW switch 605 on a path 608. The SW switch 613 receives the packet back from VSF4, determines that processing by the chain is concluded, and forwards the packet to the destination VM 612. The SW switch 613 thus intercepts traffic from each of the physical devices and forwards the traffic to a physical or virtual service function. Each of the physical devices has a different source MAC address based on different respective network interface cards, for instance.

FIG. 7B depicts an example table 740 of data indicating original header and/or payload data, and a corresponding chain identifier (ID) and chain of functions, consistent with FIG. 7A. The original header and/or payload data is data2 and can include information such as in FIG. 5C, e.g., source IP address, a destination IP address, a source MAC address, a destination MAC address, a source port identifier, a destination port identifier and a protocol. Data2 is classified as being associated with a chain of functions having an identifier of ID2. Note that different packets can be processed by different chains concurrently. The chain comprises service functions in the sequence of: VSF1, PSF2, PSF3, VSF4.

The table also depicts a cross-referenced list for the chain of a most recent function, a source address of the most recent function, a next function and a destination address of the next function. The first row of the list indicates that when there is no most recent function, the next function in the chain is VSF1 having a destination address of DA_VSF1. The second row of the list indicates that when VSF1 is the most recent function, as identified by the source address of SA_VSF1, the next function in the chain is PSF2 having a destination address of DA_PSF2. The third row of the list indicates that when PSF2 is the most recent function, as identified by the source address of SA_PSF2, the next function in the chain is PSF3 having a destination address of DA_PSF3. The fourth row of the list indicates that when PSF3 is the most recent function, as identified by the source address of SA_PSF3, the next function in the chain is VSF4 having a destination address of DA_VSF4. The fifth row of the list indicates that when VSF4 is the most recent function, as identified by the source address of SA_VSF4, there is no next function in the chain. The source and destination addresses in the tables 640 and 740 may be MAC addresses, in one example implementation.

Figure 7C:
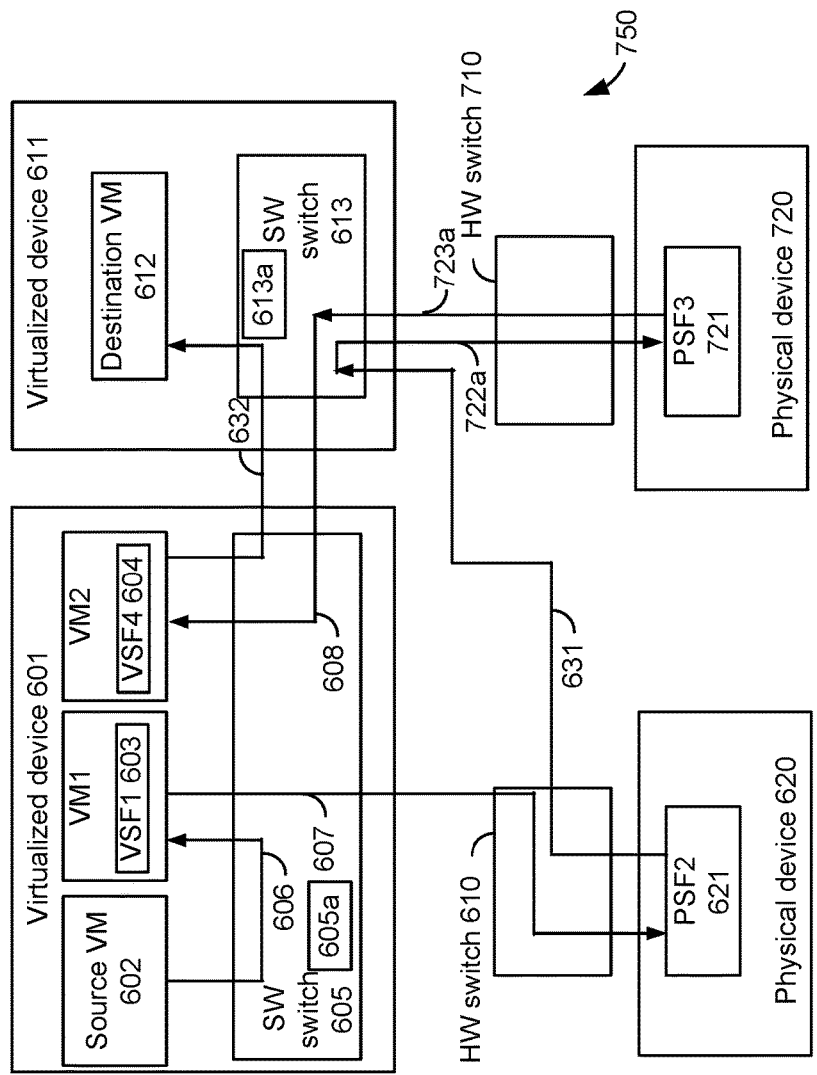
FIG. 7C depicts an example network for implementing the process of FIG. 5A, where two virtualized devices, two physical devices and two hardware switches are provided, according to an embodiment.

FIG. 7C depicts an example network 750 for implementing the process of FIG. 5A, where two virtualized devices, two physical devices and two hardware switches are provided, according to an embodiment. This differs from FIG. 7A in that here, each physical device 620 and 720 is associated with a different HW switch 610 and 710, respectively.

A packet from the source VM is processed on path 606 by forwarding it to VSF1 603. When the SW switch receives the packet back from VSF1 on path 607 it forwards the packet to PSF2 via the HW switch 610. The physical device 620 hosting PSF2 forwards the packet on a path 631 to the SW switch 613 based on an IP destination address of the packet. The SW switch determines that the next function in the chain is PSF3 based on receiving the packet from a MAC address of physical device 620 (and knowing this address is associated with PSF2), and forwards the packet to PSF3 via the HW switch 710 on a path 722a. The physical device 720 hosting PSF3 forwards the packet on a path 723a to the SW switch 613 based on the IP destination address of the packet. The SW switch 613 determines that the next function in the chain is VSF4 based on receiving the packet from a MAC address of physical device 720 (and knowing this address is associated with PSF3), and forwards the packet to VSF4 via the SW switch 605 on a path 608. The SW switch 613 receives the packet back from VSF4 in a path 632, determines that processing by the chain is concluded, and forwards the packet to the destination VM 612.

Figure 8:
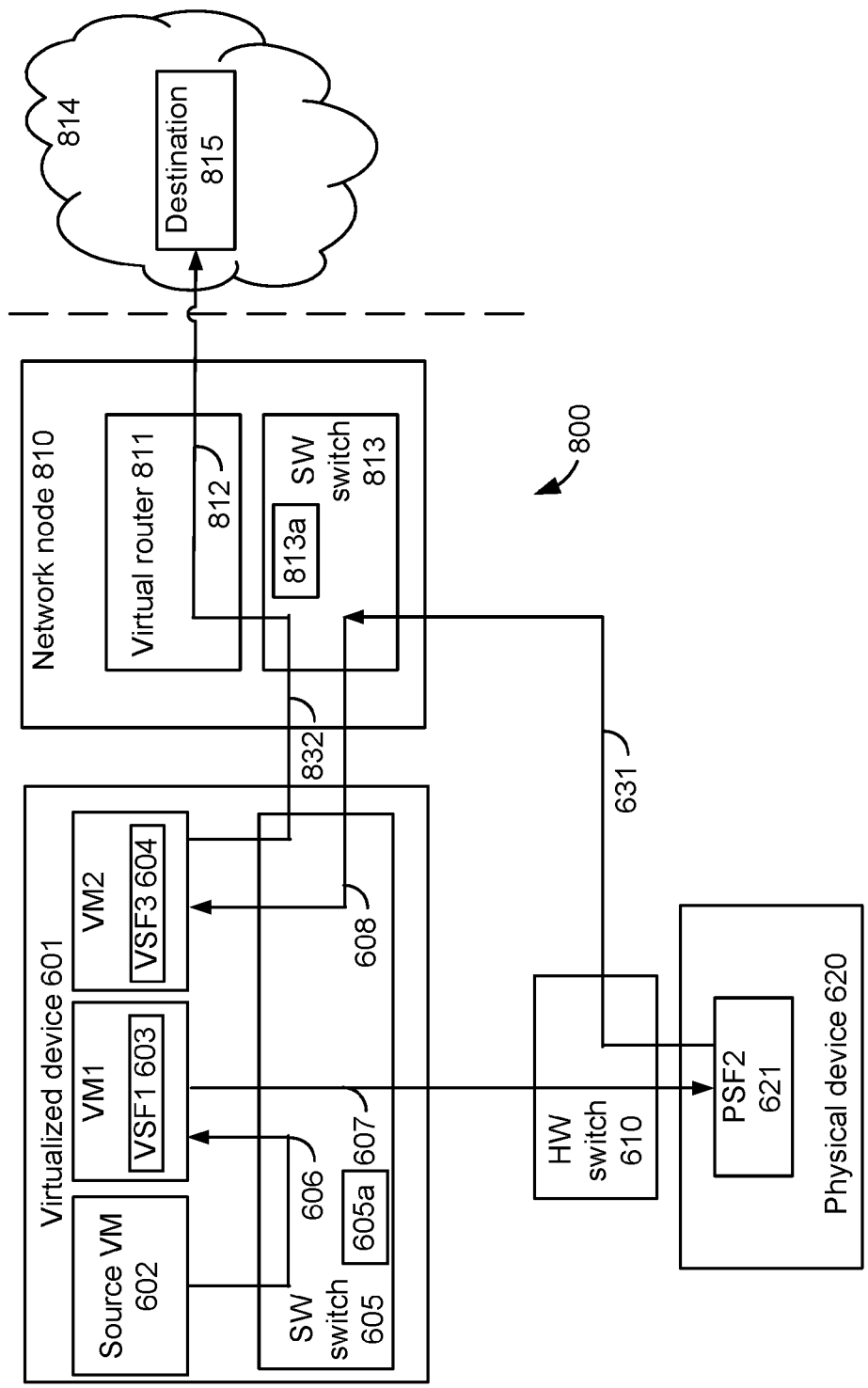
FIG. 8 depicts an example network for implementing the process of FIG. 5A, where a packet destination is reached via a network node, according to an embodiment.

FIG. 8 depicts an example network 800 for implementing the process of FIG. 5A, where a packet destination is reached via a network node, according to an embodiment. In this example, the destination of the packet is external to the network of the source which generated the packet. For example, the destination 815 can be a computing device such as a server or client device connected to the Internet 814. Additionally, a virtual router 811, or a router implemented in software, is provided to route the packet to the destination. In some cases, a software switch in a network forwards packets to a destination within the network while a router in a network forwards packets to a destination outside the network.

The operation is similar to that of FIG. 6A. When the packet is returned to the SW switch 813 on a path 832, it determines that processing by the chain is concluded, and that the destination is outside the network (to the right of the vertical dashed line). Based on this determination, the SW switch 813 forwards the packet to the virtual router 811. The virtual router in turn forwards the packet on a path 812 to the destination. The virtual router and the switch 813 are in a network node 810, which is a computing device such as a server used for interfacing computing devices in a network with computing devices outside the network. The SW switch 813 has a classifier 813a similar to the classifier 613a discussed previously.

Figure 9:
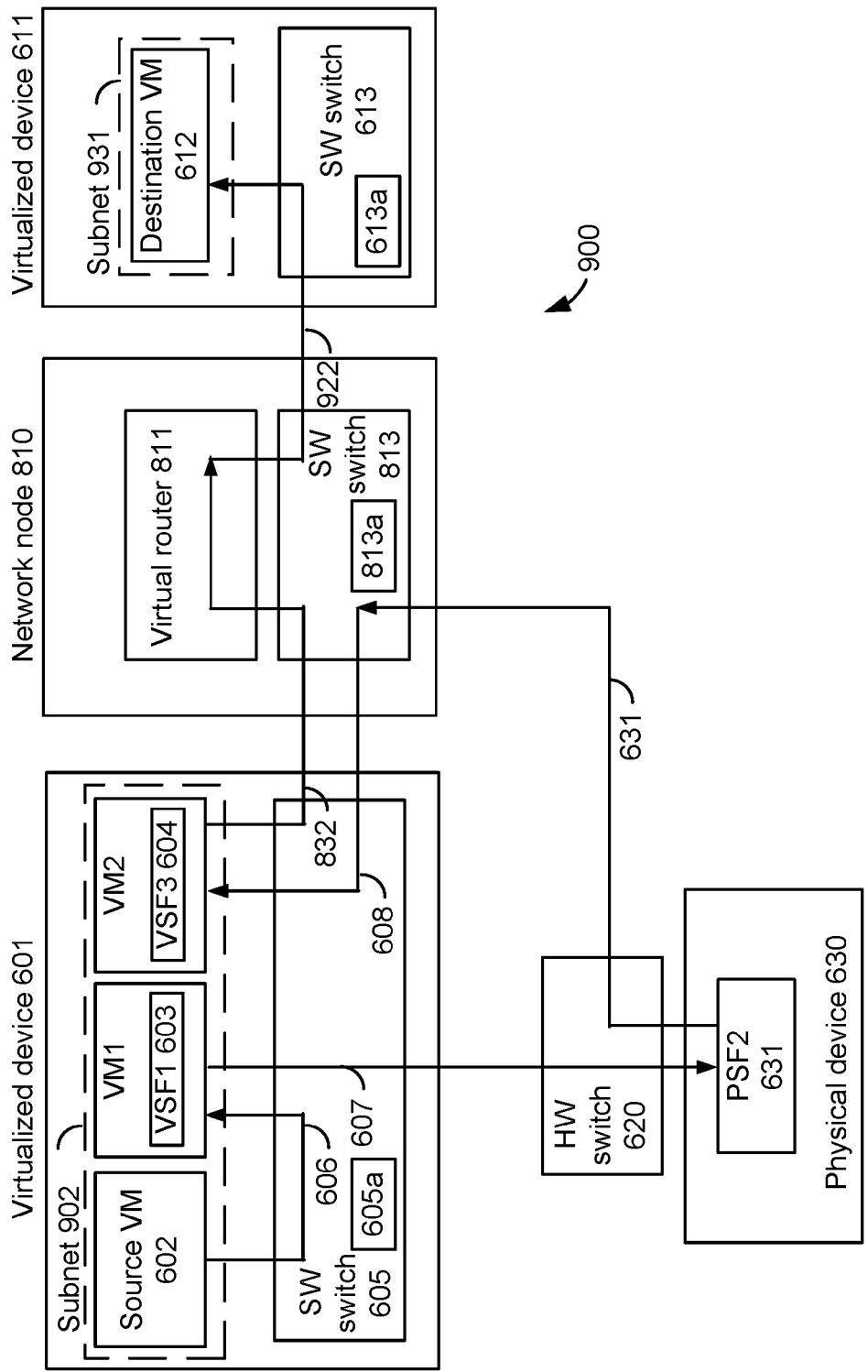
FIG. 9 depicts an example network for implementing the process of FIG. 5A, where a packet source is processed in virtualized devices in different subnets of a network, according to an embodiment.

FIG. 9 depicts an example network 900 for implementing the process of FIG. 5A, where a packet source is processed in virtualized devices in different subnets of a network, according to an embodiment. A subnet is part of a larger network. In this example, the source VM, VM1 and VM2 in the virtualized device 601 are in a first subnet 902 and the destination VM 612 in the virtualized device 611 is in a second subnet 931.

The operation is similar to that of FIG. 6A. When the packet is returned to the SW switch 813 on a path 832, it determines that processing by the chain is concluded, and that the destination VM is in another subnet. This determination can be based on the IP destination address. The IP address may include a network prefix followed by a subnet number and a host number. Based on this determination, the SW switch 813 forwards the packet to the virtual router 811. The virtual router in turn forwards the packet on a path 922 to the destination VM in subnet 931.

It can therefore be seen that the techniques provided herein allow existing physical service functions to seamlessly integrate with virtual service functions using existing hardware switches for the purpose of service function chaining.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, numerous specific details are set forth in order to provide a thorough understanding. However, it will be clear to those of ordinary skill in the art that the embodiments may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a device, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A device, comprising:
a non-transitory memory storage comprising instructions; and
one or more processors in communication with the memory, wherein the one or more processors execute the instructions at a software switch to:
determine from an original header and/or payload of a packet the packet is subject to processing by a chain of functions, the chain of functions comprising one or more virtual network functions and one or more physical network functions;
identify a first next function in the chain of functions;
add a service function chain (SFC) header comprising an identifier of the chain of functions to the packet before forwarding the packet to the first next function in response to determining the first next function is a virtual network function among the one or more virtual network functions;
identify a second next function in the chain of functions;
remove the SFC header from the packet before forwarding the packet to the second next function without the SFC header in response to determining the second next function is a physical network function among the one or more physical network functions;
re-determine from the original header and/or payload of the packet the packet is subject to processing by the chain of functions and identify a third next function in the chain of functions; and
add the SFC header to the packet before forwarding the packet to the third next function in the chain of functions in response to determining the third next function is another virtual network function.

2. The device of claim 1, wherein the one or more processors execute the instructions at the software switch to:
set a destination medium access control (MAC) address of the packet to an address of an input port of the first next function before forwarding the packet to the first next function.

3. The device of claim 2, wherein the one or more processors execute the instructions at the software switch to:
determine that the first next function is a virtual network function based on receiving the packet from a preceding virtual network function in the chain of functions.

4. The device of claim 1, wherein the one or more processors execute the instructions at the software switch to:
set a destination Medium Access Control (MAC) address of the packet to an address of an input port of the second next function before forwarding the packet to the second next function.

5. The device of claim 1, wherein:
to determine that the packet is subject to processing by the chain of functions, the one or more processors execute the instructions at the software switch to determine that fields in an original header and/or payload of the packet match a specified set of fields.

6. The device of claim 5, wherein:
the specified set of fields indicate the packet is from a specified source and is being sent to a specified destination.

7. The device of claim 6, wherein:
the specified source comprises at least one of an Internet Protocol (IP) address, Medium Access Control (MAC) address or port; and
the specified destination comprises at least one of an Internet Protocol (IP) address, Medium Access Control (MAC) address or port.

8. The device of claim 5, wherein:
the specified set of fields indicate the packet is transmitted using a specified protocol.

9. The device of claim 8, wherein:
the specified protocol comprises at least one of Transmission Control Protocol (TCP), User Datagram Protocol (UDP) or Internet Control Message Protocol (ICMP).

10. The device of claim 1, wherein:
the one or more virtual network functions are hosted on one or more virtualized devices; and
the one or more physical network functions are hosted on one or more physical devices but not on a virtualized device.

11. A computer-implemented method for accessing data, comprising:
with one or more processors:
determining from an original header and/or payload of a packet that the packet is to be processed by a chain of functions;
in response to the determining that the packet is to be processed by the chain of functions, determining that a next function in the chain of functions is a virtual network function;
in response to the determining that the next function is the virtual network function, adding a service function chain (SFC) header comprising an identifier of the chain of functions to the packet, and forwarding the packet to the virtual network function with the SFC header;
after the forwarding the packet to the virtual network function with the SFC header, determining that a next function in the chain of functions is a physical network function;
in response to the determining that the next function is the physical network function, removing the SFC header and forwarding the packet to the physical network function without the SFC header;
after the forwarding the packet to the physical network function without the SFC header, receiving the packet from the physical network function and re-determining from the original header and/or payload that the packet is to be processed by the chain of functions;
in response to the re-determining that the packet is to be processed by the chain of functions, determining that a next function in the chain of functions is another physical network function; and
in response to the determining that the next function is the another physical network function, forwarding the packet to the another physical network function without the SFC header.

12. The computer-implemented method of claim 11, wherein:
the re-determining from the original header and/or payload that the packet, which is received by a software switch from the physical network function, is to be processed by the chain of functions comprises matching on a source MAC address in the original header of the packet.

13. A non-transitory computer-readable medium storing computer instructions for accessing data, that when executed by one or more processors, cause the one or more processors to perform the steps of:
receiving a packet from a physical network function;
determining from an original header and/or payload of the packet that the packet is to be processed by a chain of functions which includes the physical network function;
in response to the determining that the packet is to be processed by the chain of functions, determining that a first next function in the chain of functions is a virtual network function;
in response to the determining that the first next function is the virtual network function, forwarding the packet to the first next function with a service function chain (SFC) header;
after the forwarding the packet to the first next function with the SFC header, determining that a second next function in the chain of functions is a physical network function;
in response to the determining that the second next function is the physical network function, removing the SFC header and forwarding the packet to the second next function without the SFC header;
after the forwarding the packet to the second next function without the SFC header, receiving the packet from the second next function and re-determining from the original header and/or payload that the packet is to be processed by the chain of functions;
in response to the re-determining that the packet is to be processed by the chain of functions, determining that the packet has concluded processing by the chain of functions; and
in response to the determining that the packet has concluded processing by the chain of functions, forwarding the packet to a destination which is identified in the original header.

14. The non-transitory computer-readable medium of claim 13, wherein:
the destination of the packet is a virtualized device in a network; and
the forwarding of the packet to the destination uses a software switch.

15. The non-transitory computer-readable medium of claim 13, wherein:
the determining that the packet has concluded processing by the chain of functions occurs at a software switch at a network node of a network;
the destination of the packet is external to the network; and
the forwarding of the packet to the destination uses a software router at the network node.

16. The non-transitory computer-readable medium of claim 13, wherein:
the determining that the packet has concluded processing by the chain of functions occurs at a software switch at a network node of a network;
the virtual network function is hosted in a virtualized device in one subnet of the network;
the destination of the packet is in another subnet of the network; and
the forwarding of the packet to the destination uses a software router at the network node.

17. The non-transitory computer-readable medium of claim 13, wherein:
the re-determining from the original header and/or payload that the packet is to be processed by the chain of functions comprises matching on a source MAC address in the original header.

\* \* \* \* \*